UNITED STATES PATENT OFFICE.

CHARLES E. STEVENS, OF NORTHAMPTON, MASSACHUSETTS.

COMPOSITION FOR GRINDING-WHEELS.

SPECIFICATION forming part of Letters Patent No. 225,658, dated March 16, 1880.

Application filed February 5, 1880.

*To all whom it may concern:*

Be it known that I, CHARLES E. STEVENS, of Northampton, of the county of Hampshire and State of Massachusetts, have invented a certain new and useful Improvements in Compositions for the Manufacture of Wheels or various other articles or implements for polishing, sharpening, or grinding metallic or various other surfaces; and I do hereby declare the following to be a full, clear, and exact description of the said invention.

The object and purpose of it is to cheaply produce a wheel or article applicable to any and all of the purposes of polishing, grinding, or sharpening any of the commonly-used metals, such as steel, iron, or brass, without such wheel or article becoming heated or glazed to any material extent in so doing.

My invention consists in a composition for making solid wheels, it consisting of emery or corundum and silicate of soda, carbonate of lime, and oxide of manganese, said composition being pressed into molds of the required form and size, which are to be placed in a room or oven heated by passing steam through coils of steam-pipe until the contents of the said molds are thoroughly hardened, which takes about forty-eight hours, the room or oven being heated to a temperature from 75° to 212° Fahrenheit.

To enable others skilled in the art to make my invention, I will now proceed to describe the same as follows:

To five pounds of powdered or granulated emery or corundum I add one pound of carbonate of lime and one-fourth pound of oxide of manganese. These substances, in the proportions named, are to be thoroughly mixed together, and then enough of liquid silicate of soda should be added to the mixture to produce, when thoroughly mixed, a mass sufficiently plastic to be molded. Next the material is to be put into suitable molds of the desired shape or size and pressed therein sufficiently. After the wheels may have been molded and pressed they are to be taken from the molds and placed in a room, oven, or chamber wherein the temperature of the air is produced by steam passing through coils of steam-pipes, such temperature ranging from 75° to 212° Fahrenheit, as circumstances may require. The wheels should remain thus subjected to heat until they may have become thoroughly hardened, in which case, as I have found by actual tests, they will be capable of abrading the hardest metals without becoming materially heated or glazed.

Having thus described my invention, what I claim as new, and desire to secure by Letters Patent, is—

The described composition for the manufacture of wheels or implements for polishing, grinding, or sharpening, such composition consisting of emery or corundum, silicate of soda, carbonate of lime, and oxide of manganese, in or about in the proportions hereinbefore specified.

CHARLES E. STEVENS.

Witnesses:
CHARLES N. CLARK,
L. R. KNOX.